United States Patent [19]

Froeschke

[11] Patent Number: 4,963,084
[45] Date of Patent: Oct. 16, 1990

[54] GRANULATING APPARATUS

[75] Inventor: Reinhard Froeschke, Weinstadt, Fed. Rep. of Germany

[73] Assignee: Santrade Ltd., Luzern, Switzerland

[21] Appl. No.: 489,873

[22] Filed: Mar. 6, 1990

Related U.S. Application Data

[63] Continuation of Ser. No. 155,716 filed as PCT DE87/00196 on May 6, 1987 published as WO87/06880 on Nov. 19, 1987, abandoned.

[30] Foreign Application Priority Data

May 9, 1986 [DE] Fed. Rep. of Germany ....... 3615677

[51] Int. Cl.$^5$ .................... B30B 11/20; B01J 2/12
[52] U.S. Cl. .................... 425/331; 425/365; 425/367; 425/DIG. 230; 264/141
[58] Field of Search ............ 425/331, 365, DIG. 230, 425/348 R, 380, 381, 382 R, 348 R, 294, 235, 237, 314, 447; 264/141, 140

[56] References Cited

U.S. PATENT DOCUMENTS

| 1,804,283 | 5/1931 | Sizer | 425/331 |
|---|---|---|---|
| 2,063,404 | 12/1936 | Selman | 425/331 |
| 2,234,595 | 3/1941 | Gano | 241/84.2 |
| 2,295,838 | 9/1942 | Glaze | 425/331 |
| 3,234,894 | 2/1966 | Dechert | 425/DIG. 230 |
| 3,354,844 | 11/1967 | Roll et al. | 425/331 |
| 4,279,579 | 7/1981 | Froeschke | 425/6 |
| 4,610,615 | 9/1986 | Froeschke | 425/8 |

FOREIGN PATENT DOCUMENTS

| 166200 | 5/1985 | European Pat. Off. |
| 570100 | 2/1933 | Fed. Rep. of Germany |
| 1796248 | 9/1959 | Fed. Rep. of Germany |
| 1237540 | 3/1967 | Fed. Rep. of Germany |
| 1287045 | 1/1969 | Fed. Rep. of Germany |
| 1454887 | 2/1969 | Fed. Rep. of Germany |
| 2941802 | 1/1983 | Fed. Rep. of Germany |
| 60-234798 | 11/1985 | Japan |
| 8204241 | 7/1984 | Netherlands |
| 455733 | 10/1936 | United Kingdom |

*Primary Examiner*—Jay H. Woo
*Assistant Examiner*—Khanh P. Nguyen
*Attorney, Agent, or Firm*—Burns, Doane, Swecker & Mathis

[57] ABSTRACT

A granulating apparatus includes a hollow roll equipped on its internal circumference with axially extending toothed ledges and a co-rotating contact pressure roll, equipped with corresponding axial toothed ledges on its outer circumference, and engaging in the hollow roll in the lower area of the latter. The hollow roll is provided with axially extending rows of holes between its toothed ledges. The toothed ledges of the hollow roll and pressure roll intermesh to form a tapering nip zone therebetween. The material to be granulated is fed into the hollow roll and into the nip zone. By means of the cooperation of the toothed ledges, the material is pressed out forcibly and volumetrically in the downward direction. The drops being formed fall onto a cooling conveyor and are allowed to solidify thereon. The mass is extruded forcibly and with a defined volume. By virtue of the cooperation of rotating parts, high production rates are possible.

15 Claims, 2 Drawing Sheets

GRANULATING APPARATUS

This application is a continuation, of application Ser. No. 155,716, filed as PCT DE87/00196 on May 6, 1987, published as WO87/06880 on Nov. 19, 1987, now abandoned.

BACKGROUND OF THE INVENTION

The invention concerns a granulating apparatus.

Granulating means are known (DE-AS No. 12 87 045), and are used for example in the processing of sugar massecuite into granules or in the production of feed. In those cases a rotating hollow roll is provided, with which on diametrically opposed parts of the inner wall located approximately in a horizontal plane, two contact pressure rolls are associated, intended to press out the material to be processed, introduced axially into the hollow roll, in the area between the driven hollow roll and the contact pressure rolls through orifices in the hollow roll. A gap is provided between the contact pressure rolls and the inwardly directed circumference of the hollow roll. The higher pressure prevailing in the form of this gap is sufficient to press the material in granulating strands out through the orifices. A blade is applied against the outside circumference of the hollow roll, whereby the granulating strands are cut into suitable lengths.

Granulating devices of this type have the disadvantage that they cannot be used for all masses to be granulated. Relatively low viscosity masses cannot be processed in this manner, as it cannot be prevented that such masses flow out by themselves at least partially through the orifices of the rotating hollow roll. A further disadvantage consists of the fact that the extruded masses cannot be metered other than in a very coarse manner, by means of the scraper blade.

For this reason, in particular for masses tending to drip, different devices with rotating perforated hollow rolls have been provided (DE P No. 29 41 802), wherein the mass to be processed is extruded by a certain pressure through a stationary row of orifices and is deposited in the form of droplets by means of intermittently passing orifices of a perforated hollow cylinder, onto a cooling conveyor under said cylinder. These so-called droplet formers have proved to be highly advantageous in actual practice, but have certain disadvantages in the extrusion of high viscosity masses. It is further not possible with these devices to always produce drops with a certain volume, independently of the mass to be granulated.

Another apparatus is also known (DE-AS No. 12 37 540), wherein a stationary hollow roll equipped on its circumference with axially extending toothed ledges is provided. That roll is open on its frontal sides and protrudes into a container in which the material to be granulated is moving from top to bottom in the form of a bulk material. Inside the stationary toothed hollow roll, a dual arm is supported rotatingly around the axle of said hollow roll. That dual arm is equipped on both ends with a toothed contact pressure roll, with the teeth of the contact pressure rolls corresponding to the toothing of the hollow roll. The hollow roll is perforated in a part of its circumference protruding from the supply container, with holes being provided both in the tooth base of the toothed ledges and in the locations of the toothed ledges protruding farthest radially inside. The material to be granulated in this apparatus exits in the shape of small sausages. The disadvantage of such a layout, in which the revolving contact pressure rolls rotate at a high velocity and may be present in multiples, is that the metering of the material emerging in sausage form is not possible. It is further not possible to granulate the material in the form of droplets and to maintain a constant volume of such droplets. This known design is therefore not suitable for any application wherein granulation is to produce pill shapes and in which the volumetric determination of the volume of individual pills is necessary, as for example in the case of the pharmaceutical industry.

It is, therefore, the object of the invention to design a granulating apparatus of the aforementioned type in a manner such that it is well suited for the processing, in particular, of high viscosity materials and that it makes possible the accurate metering of the granules of the material to be processed.

SUMMARY OF THE INVENTION

The invention involves a granulating apparatus for the granulation of low viscosity material. The apparatus comprises a perforated hollow rotary roll and a contact pressure rotary roll eccentrically located inside the hollow roll and abutting against an inner wall of the hollow roll. Both the inner wall of the hollow roll and the outer wall of the contact pressure roll are provided with axially extending, mutually corresponding toothed ledges which intermesh to press the material through holes formed in the hollow roll between two adjacent toothed ledges. The hollow roll is support for rotation about an axis and is provided over its entire circumference with the holes. The contact pressure roll is located in the lowermost zone of the hollow roll in such manner that the toothed ledges intermesh in the lower zone to define therebetween a nip zone tapering in a common direction of rotation of the rolls. A heating device is provided for heating the material. A feeder device includes an outlet opening arranged in an area between the hollow roll and the contact pressure roll for discharging material into the nip zone. A conveyor belt is arranged to move transversely of the axis of the hollow roll beneath the hollow roll such that the material extruded through the holes falls in drop form onto the conveyor belt and solidifies thereon.

This configuration yields the great advantage that defined volumes of material are formed between the corresponding toothed ledges in the area of their intermeshing engagement the volumes being closed off by the flanks of the teeth. Those volumes are then extruded forcibly through the holes. By the choice of the shape of the teeth and of the spacing apart of the cooperating toothed ledges, a defined volume of the granules may thus be predetermined. Consequently, it is possible to reset the apparatus for a different material or droplet size by replacing the toothed ledges. It is further advantageous to provide the toothed ledges with an involute cross-sectional shape, as in this manner the volume of the spaces enclosed between the toothed ledges may also be affected by adjusting the spacing between the roll axles, which axes preferably are located above each other in a vertical plane.

Another advantage is obtained in that the material to be granulated is introduced by means of a feeder device extending axially into the hollow roll, for example in the form of a tube with outlet slots or outlet bores. The material is delivered in a defined manner into the zone formed by the gap tapering in the direction of rotation between the hollow roll and the contact pressure roll. This configuration makes it possible to move relatively low viscosity materials in a defined fashion into the zone in which the formation of droplets is to take place. The disadvantage of the uncontrolled and undesirable exit of the material in other locations of the perforated hollow roll may thus be prevented. The material introduced by the feeder device may be adjusted in its quantity to the volume to be extruded.

The novel apparatus has the further advantage that the rows of teeth engaging each other, if the axles of the rolls are arranged in a vertical plane, enclose the lowest volume between them in said vertical plane. The extrusion therefore takes place at this point. While the volume enclosed between the toothed ledges decreases toward the vertical plane, it increases in the course of the further rotation of the two rolls. This results in the creation of suction at the holes, at least in a certain zone behind the vertical plane. This provides the advantage that aside from the forcibly extruded material, no other material is exiting through the outlet holes in locations where it is not desired. A heating hood is further associated with the outer hollow roll to reheat any material remaining in the holes and to cause it to flow back into the gap. The feeder device may therefore also be equipped with a drip pan for the material dripping down and back or the feeder device itself may be in such a form.

BRIEF DESCRIPTION OF THE DRAWINGS

Other advantages are set forth in the description below of a preferred embodiment of the invention as depicted in the accompanying drawings.

DETAILED DESCRIPTION OF A PREFERRED EMBODIMENT OF THE INVENTION

Figure 1:
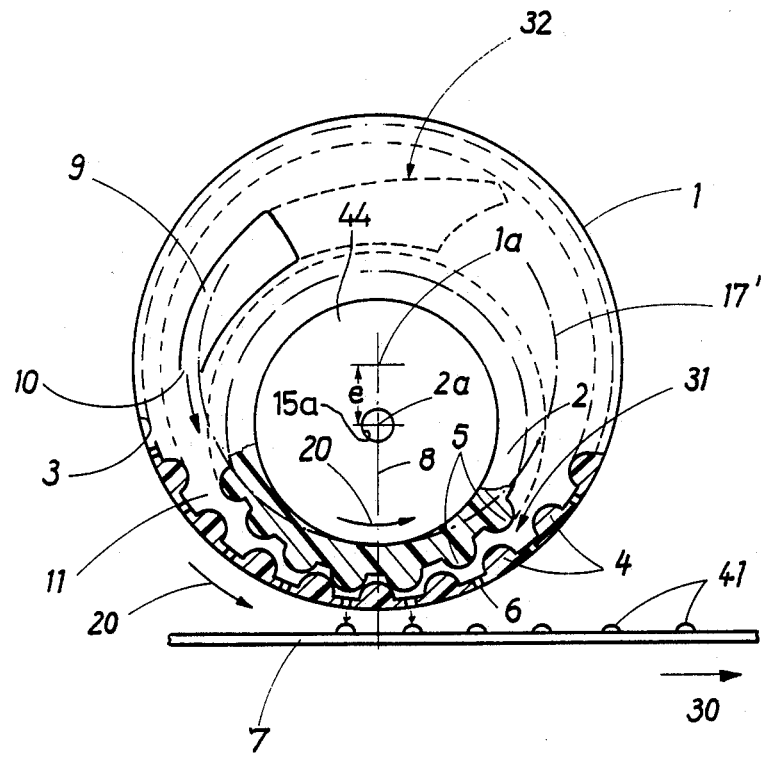
FIG. 1 shows a schematic view of the granulating apparatus according to the invention.

FIG. 1 shows a hollow roll (1) provided over its entire circumference with holes (6), said roll being supported rotatingly around its axle (1a) in a manner not shown in detail. Inside the hollow roll (1) a contact pressure roll (2) is provided in the form of a hollow cylinder with an axle (2a), the axle (2a) being located in a common vertical plane (8) with the axle (1a) of the hollow roll (1). The holes (6) in the hollow roll (1) are, as seen more closely in FIG. 3, laid out in axially extending rows and are located in a tooth bottom of the roll between two toothed ledges (4) therefore which also extend axially and are coordinated with the inner circumference of the hollow roll (1). The outer circumference of the contact pressure roll (2) is equipped in a similar manner with toothed ledges (5) configured correspondingly to the toothed ledges (4) of the hollow roll (1) and which therefore engage the toothed ledges ledges (4) of the hollow roll (1) and which therefore engage the toothed ledges (4) during the rolling of the circumference of the contact pressure roll (2) over the inner wall (3) of the hollow roll (1). For this purpose, the layout is such that the axles (1a) and (2a) are placed eccentrically by the distance (e) as a function of the diameter of the contact pressure roll (2) and of the internal diameter of the hollow roll (1), in a manner such that the toothed ledges (4) and (5) are engaging each other in the lowest zone of the circumference of the hollow roll (1). Under the hollow roll (1) a conveyor belt, such as a cooling conveyor, is moving, the direction of motion (30) whereof is tangential to the direction of rotation (20) of the hollow roll (1) and the velocity of which is correlated with the rotating velocity of the hollow roll (1).

Figure 2:
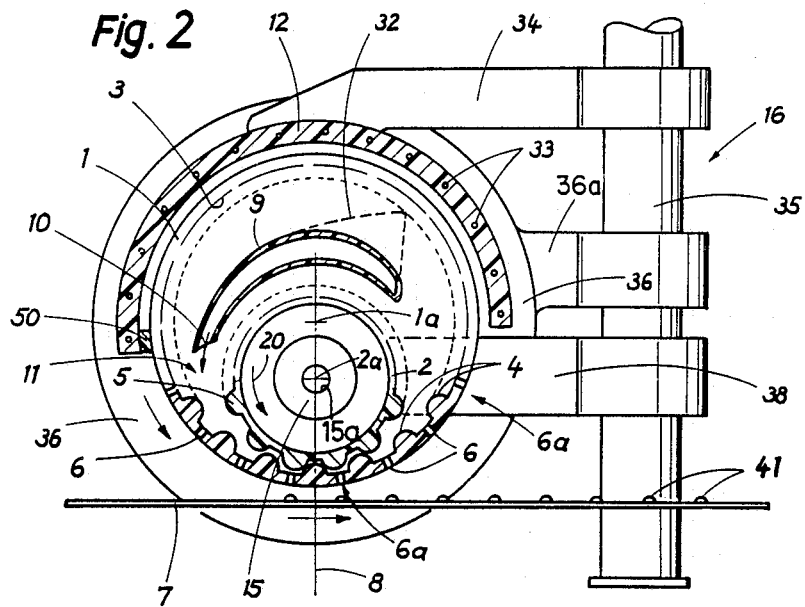
FIG. 2 is a cross section through an apparatus corresponding to FIG. 1.
Figure 3:
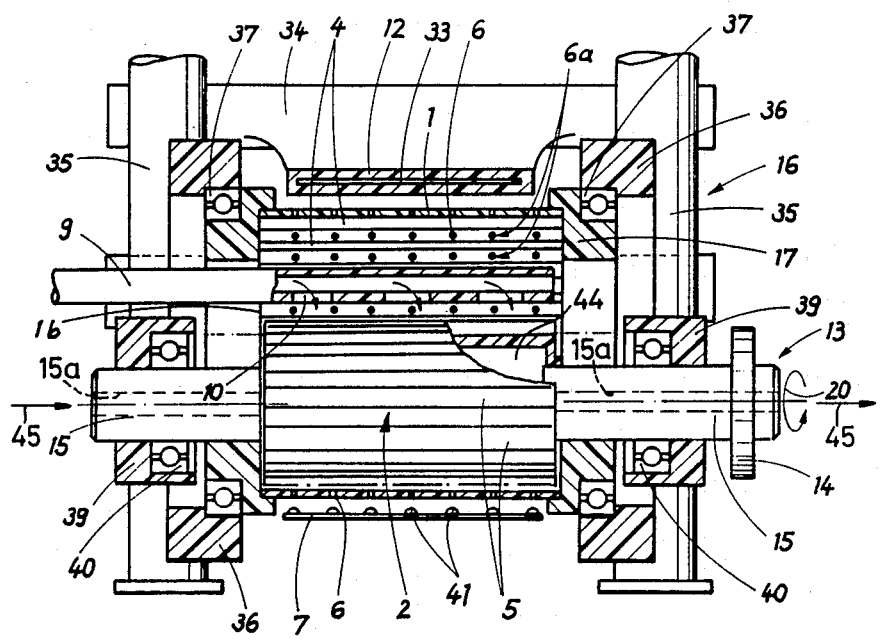
FIG. 3 is a longitudinal section through the granulating apparatus of FIG. 2.

In the intermediate space between the contact pressure roll (2) and the hollow roll (1) a feeder device (9) is inserted, which for example, as explained relative to FIGS. 2 and 3, extends axially into the hollow roll (1). The feeder device (9) is provided with one or several outlet slots or outlet bores (10), through which the material to be granulated is fed in a targeted manner into the gap or nip zones (11) between the contact pressure roll (2) and the hollow roll (1), with said gap tapering in the direction of rotation (20). It is obvious that the flowable material fed into the area between the toothed ledges (4) and (5) is initially entrained by the toothed ledges (4) of the hollow roll (1) and is then extruded forcibly by the mutual engagement of the toothed ledges (4) and (5) through the axial rows of holes and exclusively in the area of the vertical plane (8), where the space between the toothed ledges (4) and (5) has the smallest volume. As this volume may be predetermined by the mutual emgagement of the toothed ledges (4) and (5), in this novel apparatus the volume of the of the mass forced out through the holes may also be predetermined. The novel apparatus may therefore be characterized by the positive roll-off process. The novel design makes possible volumetric extrusion at a high velocity. It has been found that product granulated by the novel apparatus is especially appropriate for the pharmaceutical industry. Another advantage obtained is that the mass forcibly extruded in the area of the vertical plane (8) is prevented by the gap (31) formed behind the vertical plane (8) in the direction of rotation (20) and which widens in the rotating direction, from dripping through the holes in an undesirable manner. In the zone of the gap (31) a certain reduced pressure is being established, resulting in the fact that any material remaining in the holes (6) is largely returned to inside the hollow roll. This material can then be reheated during the continued rotation of the hollow roll (1) in the upper zone and is then, when it impacts the surface of the feeder device (9) or the plate shaped drip pan (32) indicated by shading, returned to the gap. (11), to which it flows through the drip pan and the feeder device (9). As the feeder device (9) is able to supply only a volume of material corresponding to the volume moving in the area of the vertical plane (8) downward onto the cooling conveyor (7) and solidifying thereon into solid drops, the undesirable exit of the mass to be granulated may be prevented at any location of the circumference of the hollow roll (1).

FIGS. 2 and 3 show a possible practical embodiment of the novel granulating apparatus. It is seen that the outer hollow roll (1) is provided on its internal wall with toothed ledges (4) extending axially over the entire axial length and that in the root of the teeth between two adjacent ledges (4) the rows (6a) of the holes (6) are located. The contact pressure roll (2) contained in the hollow roll (1) and adjusted in its length to the axial length of the hollow roll (1) carries on its external circumference the axially extending toothed ledges (5), which engage at the bottom the toothed ledges (4) of the hollow roll (1). The hollow roll (1) is set with its two ends in holding rings (17), which have a radial extent at least sufficient to cover the area between the mutually engaging toothed ledges (4) and (5), as indicated in FIG. 1 by the dash-and-dot circular line (17'). In the contact area therefore the mass to be granulated is enclosed radially between the toothed ledges (4) and (5) and on the axially between the holding ring (17). It is thus forcibly extruded from the hollow roll (1). As the holding rings do not completely cover the ends of the hollow roll (1), it is possible to introduce the feeder device (9) through the open part of the ends (1b) in the form of a tube into the hollow roll and to provide this tube, which may expand inside into the shape of a nozzle or has this cross section even initially, with outlet slots (10), which in the embodiment are in the shape of relatively wide slits. The part of the feeder device (9) located inside the hollow roll (1) extends with the slits (10) into the area in front of the tapering gap (11), as indicated schematically in FIG. 1. The feeder device (9) may be configured as a drip pan for the material potentially dripping in the upper area inside from the hollow roll. To assure its return into the gap (11), the feeder device (9) may be equipped with a drip pan (32) or may have the shape of such a pan even initially.

A heating hood (12) is associated with the upper zone of the hollow roll, as indicated schematically in FIG. 2, which may be heated by axially extending flow channels (33) with steam or other heating media. Obviously, electric heating is also possible. This heating hood (12) covers about one-half of the circumference of the hollow roll (1). The heating hood (12) is mounted fixedly by means of a holder (34) on two lateral support columns (35) associated with the cooling conveyor (7) of a stand (16). It comprises in its rear terminal area (as—, viewed in the rotating direction of the hollow roll (1)) a guiding device, for example in the form of a baffle ledge (5), whereby any material still adhering on the outside is pressured back mechanically into the hollow roll (1).

Bearing rings (36) are further mounted on said columns (35) for enclosing the ball bearings (37) mounted on the closure rings (17). The bearing rings (36) are attached by means of a holder (36A) to the columns (35).

Finally, by means of a holder (38) a bearing rings (39) are mounted on the columns (35) in a height adjustable manner. The bearings rings (39) carry ball bearings (40) for the rotating support of the shaft stubs (15) fixedly attached on both sides to the contact pressure roll (2) in the form of a hollow cylinder. The right hand shaft stub (15) is provided with a drive pinion (14) for a drive (13) not shown in detail, which—for example by means of a further pinion—drives the drive pinion (14) by rotating it in the direction (20). By the engagement of the toothed ledges (5) with the toothed ledges (4) of the hollow roll (1), the hollow roll (1) is also rotated by the contact pressure roll (2). It would obviously also be possible to drive the hollow roll and entrain the contact pressure roll (2). By means of the novel apparatus drops (41) are placed on the cooling conveyor (7) with a defined volume, where they solidify into solid particles, preferably in the form of semispherical lenses.

As the contact pressure roll (2) has a cavity (44), both stub shafts (15) may be provided with axial bores (15a), through which a fluid heating medium may be introduced in the direction of the arrows (45) into the cavity (44) and removed from there. The contact pressure roll (2) may be heated in this manner, which may be used to temper the mass to be extruded. Naturally, it is also conceivable to provide different heating means, for example electric heating wires or the like, in the cavity (44) or on the walls of the contact roll (21). However, heating by means of a flow medium the temperature of which may be controlled in a separate circulating loop, is very simple.

The hollow roll (1) and the contact pressure roll (2) or merely the toothed ledge rings, may consist of an elastic material, for example an elastomeric plastic. They may then be produced simply by injection extrusion.

I claim:

1. Granulating apparatus for the granulation of low viscosity material comprising a perforated hollow rotary roll and a contact pressure rotary roll eccentrically located inside the hollow roll and abutting against an inner wall of the hollow roll, the hollow roll and the contact pressure roll being rotatable about first and second parallel horizontal axes lying in a substantially vertical plane common to both axes, both the inner wall of the hollow roll and an outer wall of the contact pressure roll provided with axially extending, mutually corresponding toothed ledges which intermesh to press the material through holes formed in the hollow roll between two adjacent toothed ledges thereof, the hollow roll being supported for rotation about said first axis and provided over its entire circumference with said holes, the contact pressure roll being located in the lowermost zone of the hollow roll in such manner that the toothed ledges intermesh in the lowermost zone to define therebetween a nip zone tapering in a common direction of rotation of the rolls, first heating means carried by the contact pressure roll and arranged to heat a lower portion of the contact pressure roll disposed in the lowermost zone to maintain material in the nip zone at low viscosity, a second heating means for heating said hollow roll for maintaining material in said holes at low viscosity, said feeder device including outlet opening means arranged in an area of the nip zone between the hollow roll and the contact pressure roll for discharging material into the nip zone, the pressure roll contacting two ledges of the hollow roll as a hole disposed between such two contacted ledges reaches the lowermost zone so that a suction created at such hole after the hole passes the lowermost zone is sufficient to prevent material from flowing out of the hole, and a conveyor belt arranged to move transversely of the axes beneath the hollow roll such that material extruded through the holes falls in drop form onto the conveyor belt and solidifies thereon.

2. Granulating apparatus according to claim 1, wherein the conveyor belt is in the form of a cooling conveyor.

3. Granulating apparatus according to claim 1, wherein said toothed ledges are of convex cross-section.

4. Granulating apparatus according to claim 1 including means for adjusting the axles of the hollow roll and the contact pressure roll vertically relative to each other.

5. Granulating apparatus according to claim 1, wherein said feeder device is in the form of a feeder tube protruding axially through an open annular gap in one end of the hollow roll.

6. Granulating apparatus according to claim 5, wherein said outlet opening of the feeder tube comprises axially spaced slots disposed between said hollow roll and said contact pressure roll at an elevation below an uppermost portion of said contact pressure roll.

7. Granulating apparatus according to claim 1, wherein said heating device includes a heating hood covering a portion of the hollow roll and carrying means for pushing back into the hollow roll material adhering to the outside thereof.

8. Granulating apparatus according to claim 1 including means for driving the contact pressure roll.

9. Granulating apparatus according to claim 1 including means for driving the hollow roll.

10. Granulating apparatus according to claim 8 including a support stand, the contact pressure roll being in the form of a hollow cylinder equipped on both ends with shafts supporting the contact pressure roll in the stand.

11. Granulating apparatus according to claim 10, wherein one of said shafts carries a drive pinion.

12. Granulating apparatus according to claim 10 including a support stand, a rotating holder mounted on the stand, the hollow roll comprising a cylinder affixed to the holder, the contact pressure roll mounted on the stand.

13. Granulating apparatus according to claim 12 wherein both shafts are provided with axially extending bores defining with an interior of said contact pressure roll a conduit for conducting a heating medium through hollow interior of said contact pressure roll, said conduit constituting said heating means.

14. Granulating apparatus according to claim 13 including additional heating means disposed outside of and adjacent an upper portion of said hollow roll.

15. Granulating apparatus according to claim 6, wherein said nip zone is unobstructed from said slots to said vertical plane so that the material is positively pushed into said holes solely by said ledges of said contact pressure roll.

* * * * *